(No Model.) 4 Sheets—Sheet 2.
C. A. POSTLEY, Dec'd.
C. E. POSTLEY, Administrator.
GRAIN BINDING MACHINE.
No. 514,029. Patented Feb. 6, 1894.
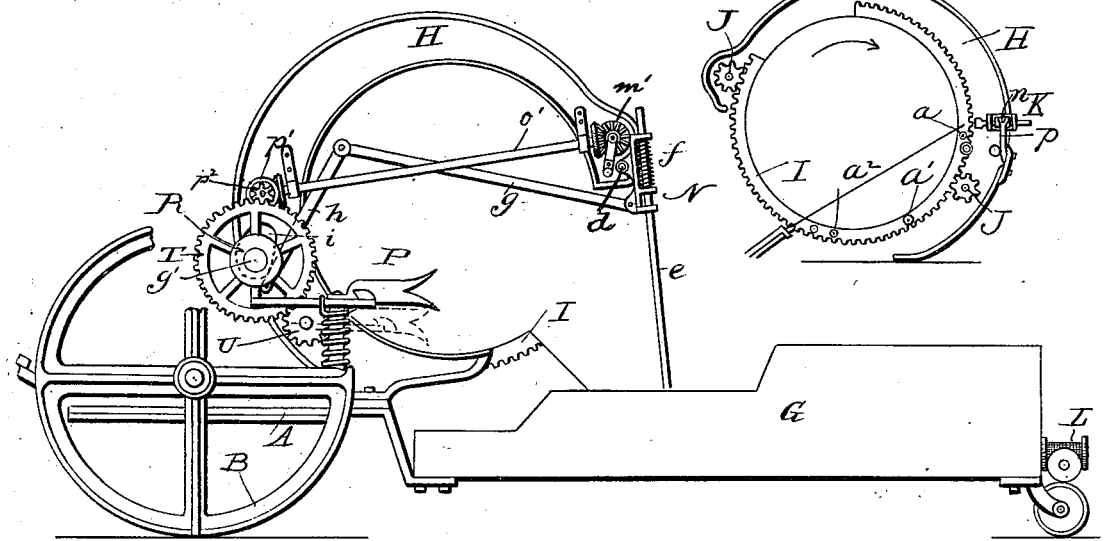
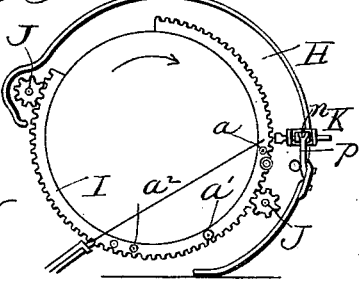
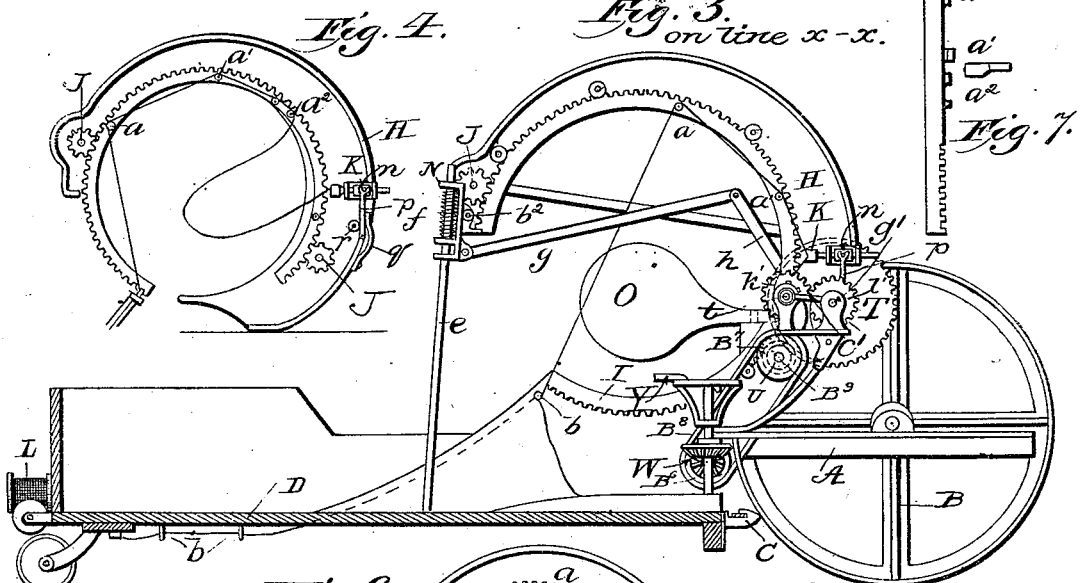
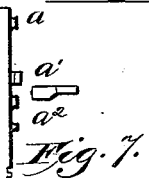
THE NATIONAL LITHOGRAPHING COMPANY,
WASHINGTON, D. C.

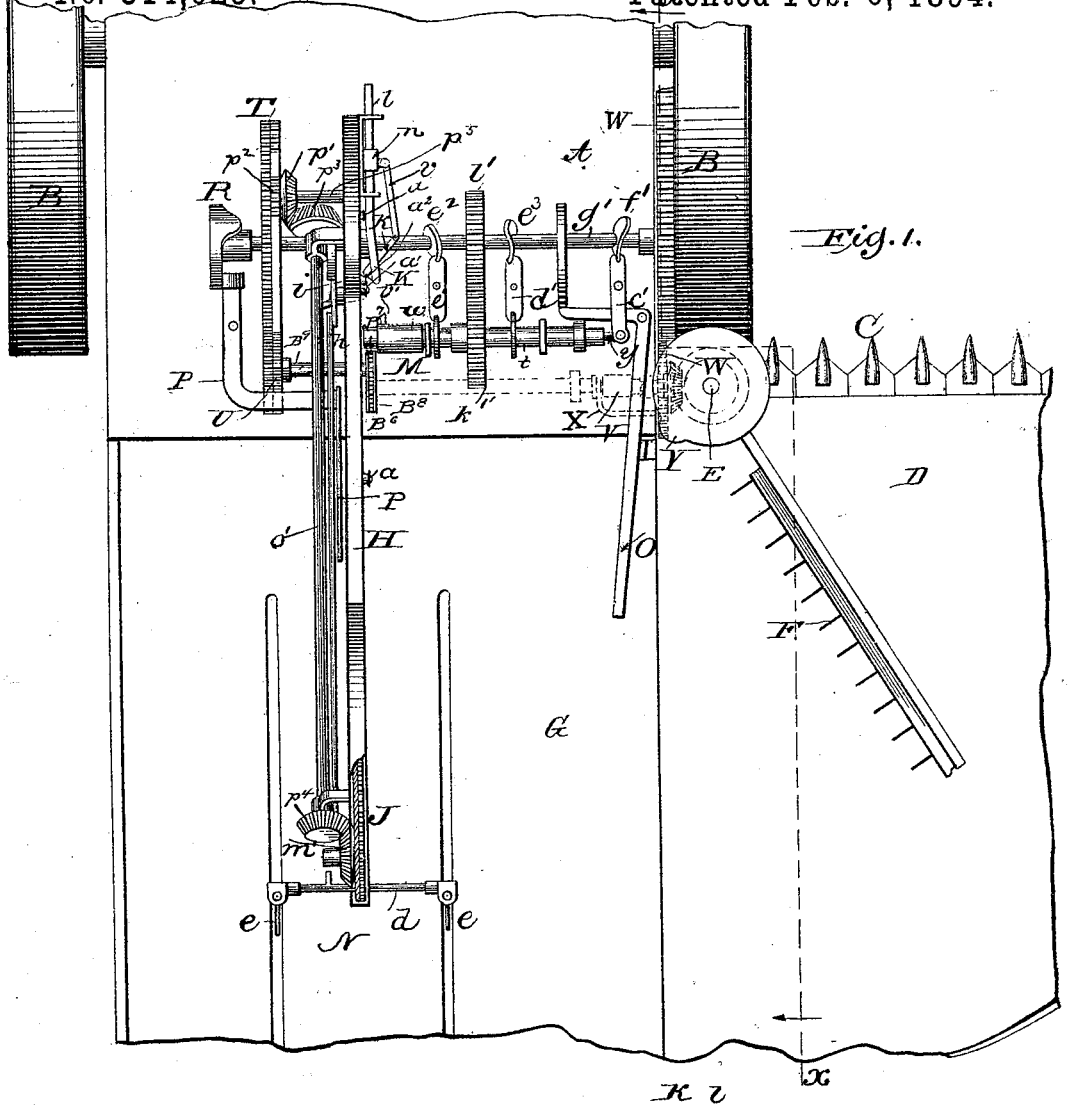

(No Model.) 4 Sheets—Sheet 3.
C. A. POSTLEY, Dec'd.
C. E. POSTLEY, Administrator.
GRAIN BINDING MACHINE.
No. 514,029. Patented Feb. 6, 1894.
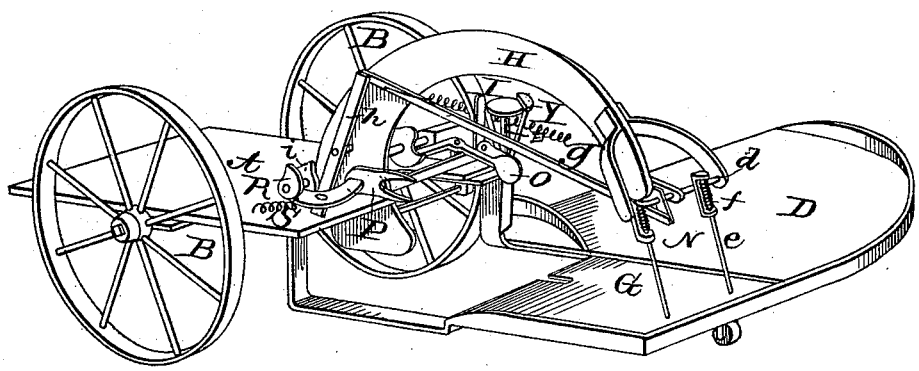
Fig. 8.
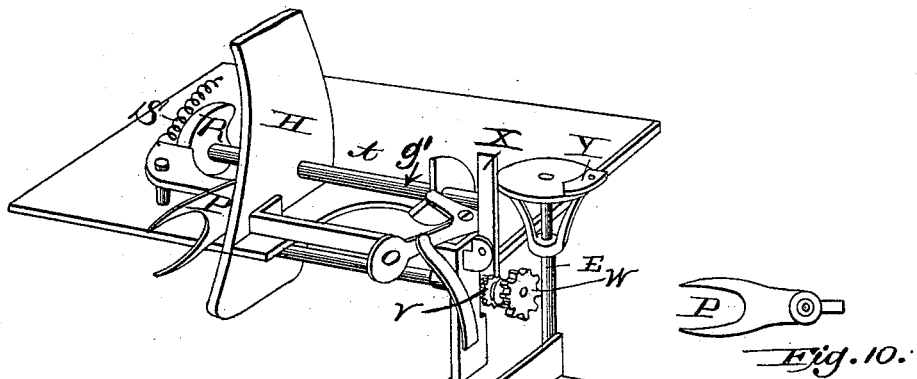
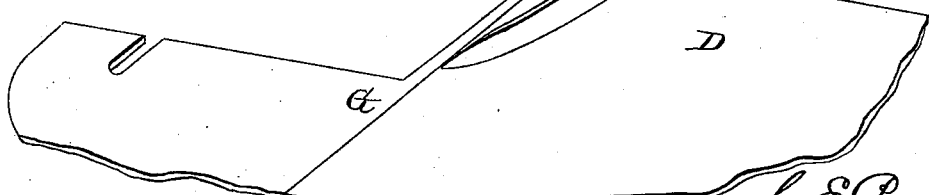
Fig. 9.
Witnesses:
Arthur Ashley
William H. Shipley
Inventor:
C. E. Postley
Administrator for
C. A. Postley, deceased
By P. T. Dodge
Attorney
THE NATIONAL LITHOGRAPHING COMPANY,
WASHINGTON, D. C.

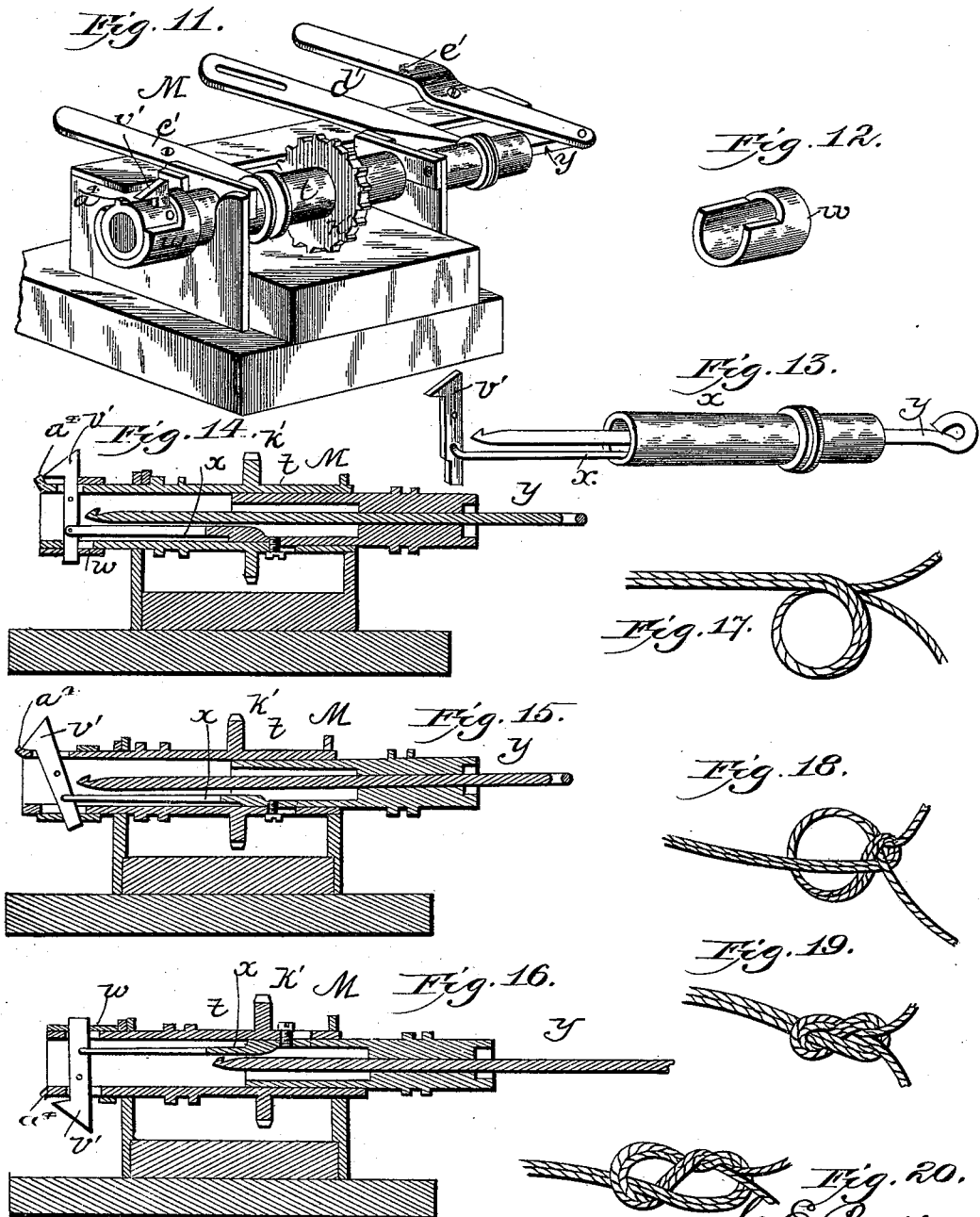

UNITED STATES PATENT OFFICE.

CHARLES E. POSTLEY, OF WASHINGTON, DISTRICT OF COLUMBIA, ADMINISTRATOR OF CHARLES A. POSTLEY, DECEASED.

GRAIN-BINDING MACHINE.

SPECIFICATION forming part of Letters Patent No. 514,029, dated February 6, 1894.

Application filed November 30, 1891. Serial No. 413,523. (No model.)

*To all whom it may concern:*

Be it known that CHARLES A. POSTLEY, deceased, late of Washington, in the District of Columbia, did invent certain Improvements in Grain-Binding Machines, of which the following is a specification.

One part of the invention consists in an improved construction and arrangement of devices for encircling the grain with cord or other binding material and presenting the same to the tyer or fastening device.

Another part of the invention relates to a rotary tying device of peculiar construction as hereinafter described and shown.

The invention also consists in a bundle-ejecting device mounted on a vertical standard and having both a vertical and a laterally swinging movement thereon.

The invention also further consists in various details and combinations hereinafter described.

Referring to the accompanying drawings,—Figure 1 represents a top plan view of the main-frame of a sweep rake harvester with the binding attachment applied thereto. Fig. 2 is an elevation of the same as viewed from the stubble side. Fig. 3 is a sectional elevation of the same on the line $x$—$x$ of Fig. 1, looking toward the stubble side. Figs. 4, 5 and 6 are outline elevations of the mechanism by which the cord is led to the gavel and presented to the tyer, the cord being shown in the several positions which it assumes in the course of the successive operations. Fig. 7 is an edge-view of the band-carrying devices. Fig. 8 is a perspective view of the harvesting and binding mechanism. Fig. 9 is a perspective view of a portion of the same, illustrating more particularly the ejecting devices. Fig. 10 is a side elevation of the main ejector. Fig. 11 is a perspective view of the tying device and its adjuncts. Fig. 12 is a perspective view of the sleeve of the tyer. Fig. 13 is a perspective view of the internal portions of the tyer. Figs. 14, 15 and 16 are longitudinal sections of the tying device with its parts in the different positions which they assume when in action. Figs. 17, 18, 19 and 20 are views illustrating the manner in which the cord is manipulated to form the knot. Figs. 21 and 22 are respectively a cross-section and a side elevation of the cord-clamping and cutting devices.

In proceeding to embody the invention a machine is first provided of the class generally known in the art at the present day as a "sweep rake harvester," such, for example, as that represented in Figs. 1 and 8, in which—

A represents the main or gear-frame sustained at its sides by two ground wheels B, which will be connected as usual through intermediate gears with the various operative portions of the machine.

C represents the cutter-bar extending laterally from the rear part of the main-frame, and D, the quadrantal grain-receiving platform located in rear of the cutter to receive the grain falling therefrom.

E represents an upright rotary shaft or head, commonly known as a "rake-head," to which there will be connected in the ordinary manner a series of radial toothed arms F, arranged to descend upon the platform as they approach the cutting edge, and sweep thence backward over the platform in the arc of a circle to deliver the grain at its stubble edge in rear of the main platform, after which they will rise and swing forward to an operative position. This raking and reeling mechanism, commonly known in the art as an "automatic sweep rake," may be of any approved form, this invention having no reference thereto.

To a machine such as above described, which may be of either of the various makes now sold in the market, is attached firmly in rear of the main-frame A, a horizontal secondary platform G, joined to the end and forming a continuation of the harvester-platform D, so as to receive the grain delivered therefrom by the rake-arms. Above the forward edge of this secondary platform is erected an upright C-shaped arm or standard H, the open side of which is presented toward the rear and above the secondary platform in order that the grain may be raked from the secondary platform in a forward direction therein. This curved or segmental standard H, is to be secured firmly in position, preferably by being bolted, as shown, to the rear end of the main harvester platform. It stands in a vertical plane lying fore and aft of the machine, that is to say in the direction in which the machine travels. The inner edge of this standard H is preferably constructed, as shown, of a true circular form.

Within the standard, which is suitably grooved or recessed for the purpose, is mounted an annular segment I, or, in other words, a bar curved to form the segment of a circle. This bar is toothed in its outer edge and arranged to engage, as shown in the various figures, with two pinions, J, mounted in horizontal axes in the standard H, so that by the action of the pinions the segment may be caused to revolve in a circular path within the standard. By its revolution its open side or end may be brought opposite to the opening in the standard H, as shown in Fig. 2, to admit of the introduction of the grain, after which by a suitable revolution of the segment it will be caused to extend across and close the opening in the standard, as represented in Fig. 5, the standard and segment jointly constituting a ring which completely encircles the gavel within it. The segment I, serves not only the purpose above mentioned of confining the gavel, but also serves the additional function of a carrier to pass the band about the gavel and present it to the tying devices. In order that it may thus carry the cord it is provided on one side with three rollers $a\, a'\, a^2$, which extend laterally beyond the side of the standard H, as represented in Figs. 1, 4, 5, 6 and 7, so that during the revolution of the segment they will be presented against the cord or wire as hereinafter explained.

At one side of the standard midway of its length or thereabout is arranged a device, K, the details of which will be hereinafter described, to hold the end of the cord and sever the band therefrom at the conclusion of the binding operation.

At a suitable point in the frame, preferably at the rear end, is arranged a spool or cord-holder, L, from which the cord is passed through suitable guides $b$, and extended thence to the holding device K. The guides $b$, and holder K, are to be arranged in such manner in relation to each other and to the segment that when the cord is stretched between them it will lie in the vertical plane traversed by the rollers $a\, a'$, &c., as they travel with the band carrier.

Previous to the binding operation the cord is extended in a right line from the holder across the lower side of the standard or receiver as represented in Fig. 5. The grain having been introduced within the standard and segment on top of the cord, the segment next revolves around the grain in the direction indicated by the arrow in Fig. 5, whereupon the rollers $a\, a'\, a^2$, passing around the gavel, are brought to bear successively upon the cord in the manner represented in Fig. 4, and with the effect to force the cord completely around the gavel and downward past the end of the holding device K, to the tying device M, which will be hereinafter explained. At the time of the severance of the applied band the newly formed end will be stretched across and above the rollers as at the beginning of the operation, as shown in Fig. 5, so that at the next revolution they again lay the cord about the gavel as before. The number of the rollers may be increased or diminished and they may be varied in form and mode of attachment as desired, provided they have an action such as described and shown.

For the purpose of delivering the grain from the secondary platform into the binding apparatus proper it is proposed to employ a swinging rake, N, such as represented in the various figures. This rake consists of a horizontal rock-shaft $d$, mounted in bearings at the end of the overhanging bracket or standard H, and provided with depending teeth $e$, which slide vertically in bearings on the rock-shaft and are urged downward by means of spiral springs $f$, encircling their upper ends, whereby their points are held in contact with the surface of the secondary frame as they sweep inward over the same. The teeth are first swung outward to the rear edge of the secondary platform, in which position they stand until the grain has been delivered inward over the main platform on to the secondary platform by the action of the rake, after which they swing downward to deliver the grain within the standard. The vibratory motion of the secondary rake is effected by means of a pitman, $g$, extending thence to a lever $h$, actuated by a cam wheel, $i$, as shown in Figs. 2 and 8.

Passing now to the details of the cord clamping and holding devices, attention is directed to Figs. 3, 21, and 22. It consists essentially of two co-operating jaws, $k$ and $l$, pivoted together after the manner of a pair of pliers or pinchers. The inner faces of the jaws are corrugated longitudinally as in Fig. 21, that they may the more firmly engage the cord, and the jaw $k$ is provided at the lower edge with a blade or cutter $m'$, which passes beneath and operates in connection with the jaw $l$, to sever the applied band at the proper time from the spool portion of the cord. The jaw $l$, which is fixed in position, has its rear end prolonged in the form of a bar to support and guide a sliding collar $n$, connected by a link, $v$, to the opposite jaw $k$. The sliding collar is pivotally connected to a lever, $p$, pivoted at its lower end and urged in opposite directions by a spring, $q$, and an eccentric, $r$ on shaft $g'$. The spring serves through the lever and sliding collar to open the clamping and cutting jaws as the eccentric recedes. The eccentric, on the contrary, serves to overcome the spring and close the jaws at the proper time.

Passing now to the tying mechanism M, attention is directed to Figs. 1, and 11 to 20. As clearly shown in the several figures the tying device is located adjacent to the standard and band-carrier at a short distance below the clamping and cutting devices. It is constructed as follows: An external tube or sleeve, $t$, is mounted horizontally in fixed bearings in such manner that it may rotate and also play endwise therein. At the forward end, which overhangs the bearings, this tube is provided with an external lip, $a^4$, to retain the cord in position thereon. This end is also slotted transversely to receive a jaw, $v'$, which is pivoted thereto by a transverse pivot-pin so as to revolve therewith. The operative end of this jaw extends forward toward the lip $a^4$, overlying the outer surface of the sleeve so as to confine the cord thereon. The opposite end of the jaw is projected on the opposite side of the tube or sleeve to engage an external collar, $w$. This collar, shown separately in Fig. 12, encircles the end of the sleeve or tube and is free to slide endwise thereon. On its upper side it is cut away as represented in Fig. 12, to permit the cord to pass beneath the jaw $v'$. At its opposite side it is provided with a hole to receive the rear end of the jaw $v'$ so that as the jaw is moved to clamp the cord its rear end will have the effect of moving the sleeve backward out of the way, while, on the contrary, the opposite motion of the jaw to effect the release of the cord causes the sleeve to slide forward so as to push the cord, which has, in the meantime, assumed the form of a loop, from the end of the tube.

Within the main tube or sleeve $t$, is mounted a longitudinally sliding rod $x$, preferably of a tubular form at one end, as shown. This rod is connected with the main sleeve, as shown, by a slot and screw or otherwise, so as to revolve therewith but be permitted to have an independent longitudinal movement, and is provided with an arm or extension connected to the pivoted dog $v'$, as plainly shown in the several figures so that its longitudinal motion effects the opening and closing action of the dog. Through the center of the rod $x$, and the main sleeve, is passed a longitudinally-sliding rod $y$, the forward end of which is fashioned into the form of a hook. This rod may be drawn backward within the tube or projected in a forward direction beyond the same to engage the cord. The longitudinal movements of the main sleeve $t$, rod $x$, and the hook $y$, are effected by means of levers $c'$, $d'$, and $e'$, as represented in Fig. 11, the first two entering grooves on the sleeve and rod respectively, while the last is pivoted to the end of the rod $y$. These levers receive motion, as shown in Fig. 1, from cam wheels $e^2$, $e^3$ and $f'$, on a horizontal shaft $g'$, which is mounted in the main-frame and driven in the manner hereinafter explained.

The operation of the tyer is as follows: At the completion of the binding operation the newly formed end of the cord extends from the clamp downward across one side of the tyer body $t$, and thence to the spool. As the band-placing devices complete their operation the second end of the band is laid beside the first through the clamping devices and past the side of the tyer. The tube $t$, of the tyer then moves forward in an endwise direction causing the ends of the cord to ride beneath the jaw $v'$. The backward movement of the rod $x$, next closes the jaw upon the cords which are confined firmly thereunder against the outside of the tube, the sleeve having at the same time been drawn backward. The tyer now makes slightly more than one revolution, the effect of which is to wind the cord about the end of the tube in the form of a loop and force the beveled end of the jaw against the cord in such manner as to compel the same to ride over the end of the tube so that it will extend diametrically across the open end of the same and across the middle or central portion of the loop thereon, as represented in Fig. 18. The hooked rod $y$, is next projected so as to engage the outer ends of the cord and then retracted within the tube so as to draw the ends of the cord therein and pull them through the loop, thereby completing the knot, which is then delivered from the tyer by the opening action of the jaw accompanied by the forward action of the sleeve, the sleeve forcing the loop from the tube so that it may be contracted around the ends. The result of the operation is a knot such as represented in Figs. 19 and 20. It will be understood that when the tyer grasps the ends of the applied band, the clamping-jaw acts to sever the band from the spool portion of the cord thus retaining the newly formed end and at the same time releasing the extremities of the band that they may be drawn through the loop in the form of a knot.

For the purpose of delivering the bound bundles from the machine it is proposed to employ one or more ejectors by which the bundle is removed in an endwise direction.

Referring to Fig. 8, O represents an L-shaped ejector turning on a vertical pivot and actuated by a spring and cam so that it will strike against the butts of the bundle. P represents a second ejector, which is deemed of special importance. This ejector turns also on a vertical pivot and is provided with two horizontal prongs or fingers at its active end. The prongs or fingers project within the bracket or receiver and the accumulating gavel is formed upon and around them. The horizontal swinging motion of the ejector causes the bundle to be delivered endwise from the machine.

In order to prevent the mutilation of the bundle and give an easier action of the parts this ejector is mounted loosely on a post or standard so that it is capable of moving up and down thereon to a limited extent, as indicated in full and broken lines in Fig. 2. It is actuated by means of a cam-wheel, R, bearing on its rear end, and is returned to its normal position by means of a spring, S, which also sustains it and returns it to its highest position after it has been depresssed.

Passing now to the details of the driving mechanism it will be perceived on reference to Fig. 1, that the horizontal shaft $g'$ which carries the cams for operating the various parts of the tyer and for operating the main ejector is provided with a large gear wheel, T, driven by a pinion, U, the shaft of which is driven through a clutch, V, from a pinion, W, as shown in Fig. 9, which will be connected with any suitable part of the harvester, preferably with a gear W' carried by one of the ground wheels B, as represented in Fig. 1. The clutch V, is thrown into and out of action by a lever, X, which is automatically operated at suitable intervals by a cam projection, Y, on the side of the main rake-head. Under this arrangement the rake-head is caused to set the binding devices automatically in action as it completes its backward movement and delivers the grain upon the secondary platform. An intermittent rotary motion is communicated to the tyer by means of a pinion, $k'$, encircling the same and driven by a pinion, $l'$, on the shaft $g'$, the latter being driven through the following connections, described with reference to Figs. 1, 2 and 3: on the left hand end of the clutch shaft, as viewed in Fig. 1 is a band or sprocket wheel $B^6$. Above the clutch shaft, and in a plane parallel therewith, is a short transverse shaft $B^9$ carrying at its inner end a band or sprocket wheel $B^7$ and at its outer end the pinion U above referred to. The two band or sprocket wheels $B^6$ $B^7$ are in the same plane, and are connected by a band or chain $B^8$. Thus the clutch shaft imparts motion to the shaft $B^9$ through the wheels $B^6$, $B^7$ and band or chain $B^8$. The shaft $B^9$ drives the shaft $g'$ through pinion U and gear T, and the shaft $g'$ drives the knotter-shaft $t$ through the gears $l'$, $k'$, the motion of these parts being intermittent, as already explained. The rotary segment or band carrier receives an intermitting rotary motion, as shown in Figs. 1, 2 and 5, from the pinions J, which are provided respectively on one side with bevel pinions $m'$ and $p'$, meshing with corresponding pinions on the end of a shaft $o'$. The pinion $p'$ and the front pinion J are both fixed on the same shaft $p^5$, and at the side of the bevel pinion is a spur pinion $p^2$ which meshes with the gear T whereby all these parts are driven. The pinion $p'$ meshes with a similar pinion $p^3$ on the front end of the shaft $o'$ and drives the latter. On the rear end of this shaft is a bevel pinion $p^4$ meshing with the pinion $m'$ which is fixed on the same shaft with the rear pinion J so that all these parts and the band carrier are intermittently rotated from, and by, the gear wheel T.

Having thus described the invention, what is claimed is—

1. In a binding mechanism the combination of a stationary segmental standard, and the rotary segment or band carrier provided with laterally-projecting rollers to engage the cord substantially as described.

2. In combination with the stationary segment or standard, the rotary segment provided with lateral projections to carry the band, the clamping mechanism, and the tying bill located below the clamping mechanism substantially as described.

3. In combination with the grain binding mechanism the horizontally swinging or vibrating ejector loosely mounted on a vertical axis and capable of moving up and down thereon to operate in different horizontal planes, and means for vibrating said ejector.

4. In a cord-tying device the rotary tube provided with the lip at its end, in combination with the external clamping-jaw and the internal reciprocating hook.

5. In a cord-tying device, the combination of the rotary tube, the reciprocating internal hook, the external clamping-jaw, pivoted to the tube and the external sleeve connected with and operated by the jaw, substantially as described.

6. In a cord-tying device the combination of the rotary tube, the clamping-jaw pivoted in the end of the same, the reciprocating bar for operating the jaw, and the external sleeve operated by the jaw for delivering the loop from the tube.

7. In a cord-tying device the combination of the rotary tube, the clamping jaw pivoted therein, the reciprocating rod for operating the jaw, the external sleeve for delivering the loop, and the internal reciprocating hook.

8. In a cord-tying device the combination of the rotary tube capable of reciprocating in its bearings, the external clamping jaw, the reciprocating rod for operating the jaw, the internal reciprocating hook, a rotary cam-shaft, and intermediate connections for reciprocating the tube, the clamp-operating rod, and the hook.

In testimony whereof I hereunto set my hand, this 18th day of August, 1891, in the presence of two attesting witnesses.

CHARLES E. POSTLEY,
*Administrator.*

Witnesses:
W. R. KENNEDY,
RAYMOND F. BARNES.